United States Patent [19]

Smith

[11] 3,874,224

[45] Apr. 1, 1975

[54] LEAK DETECTING APPARATUS

[75] Inventor: Richard S. Smith, Overland Park, Kans.

[73] Assignee: Seek-A-Leak, Inc., Kansas City, Mo.

[22] Filed: Aug. 29, 1973

[21] Appl. No.: 392,762

Related U.S. Application Data

[63] Continuation-in-part of Ser. No. 264,041, June 19, 1972, abandoned.

[52] U.S. Cl................... 73/40, 48/193, 73/40.5 R, 116/117 R
[51] Int. Cl............................................. G01m 3/06
[58] Field of Search........ 73/40, 40.5 R; 116/117 R; 48/193; 340/242

[56] References Cited
UNITED STATES PATENTS

| | | | |
|---|---|---|---|
| 1,959,863 | 5/1934 | Griss | 73/40 X |
| 2,796,757 | 6/1957 | Peterson | 73/40 |
| 3,103,910 | 9/1963 | Smith et al. | 116/117 R |
| 3,342,062 | 9/1967 | Smith et al. | 116/117 R X |
| 3,624,627 | 11/1971 | Evans | 73/40.5 R X |

FOREIGN PATENTS OR APPLICATIONS 1,075,861 4/1954 France.................................. 73/40

Primary Examiner—Richard C. Queisser
Assistant Examiner—Joseph W. Roskos
Attorney, Agent, or Firm—Fishburn, Gold & Litman

[57] ABSTRACT

A leak detecting apparatus for detecting flow of gas through a gas pipe system in house trailers and the like includes a tilting clear bowl partially filled with liquid and containing a submersible flow tube which is free of the liquid during normal flow and which is immersed during leak detecting conditions whereupon a leak creates visible bubbles. The leak detecting apparatus may include a cooperative arrangement associated with a door to produce a testing sequence before the door is opened. The leak detecting apparatus may include a valve member selectively movable to interrupt gas flow in the gas pipe system and bores and passages for directing any gas flow to and through the submersible flow tube.

15 Claims, 11 Drawing Figures

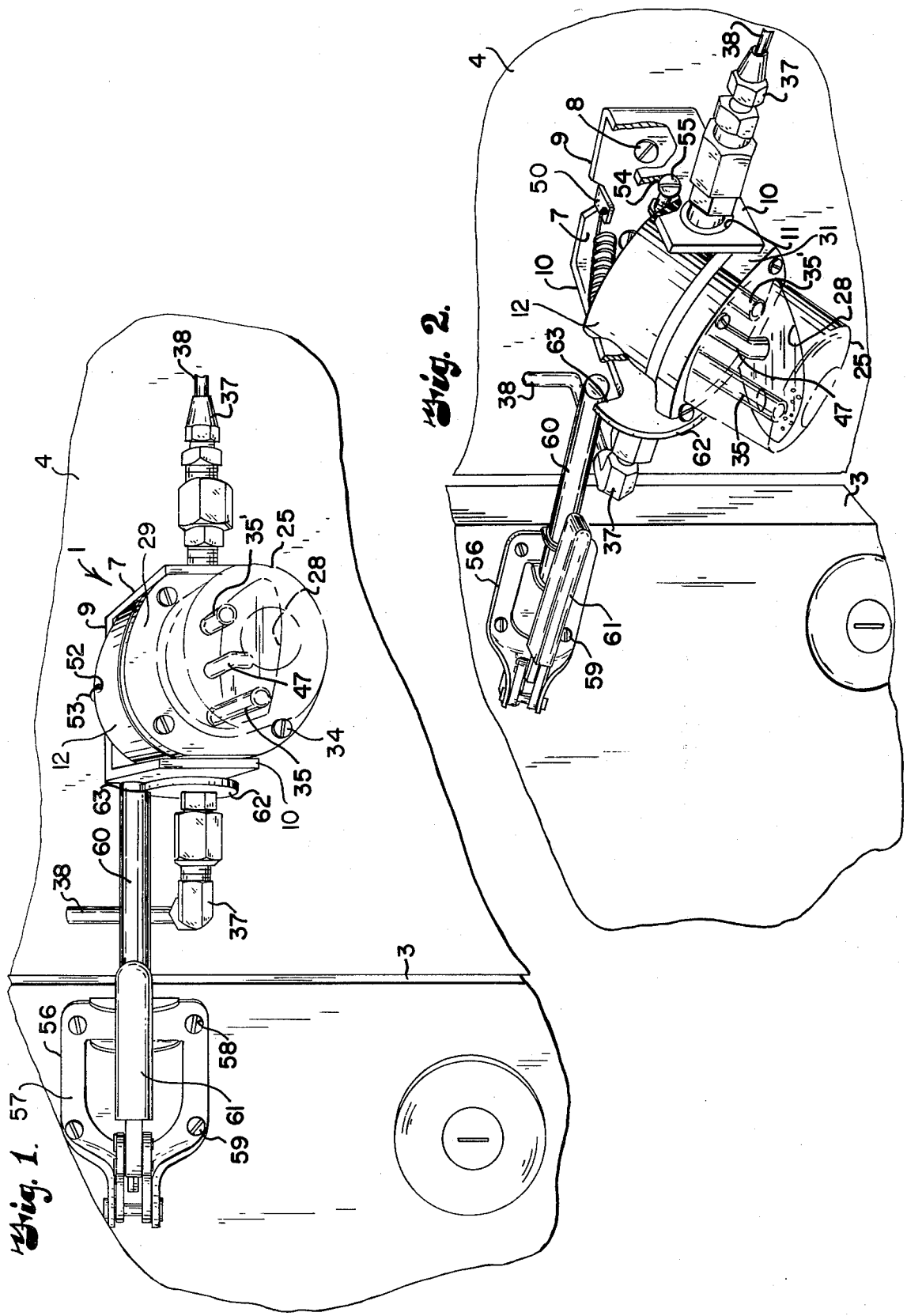

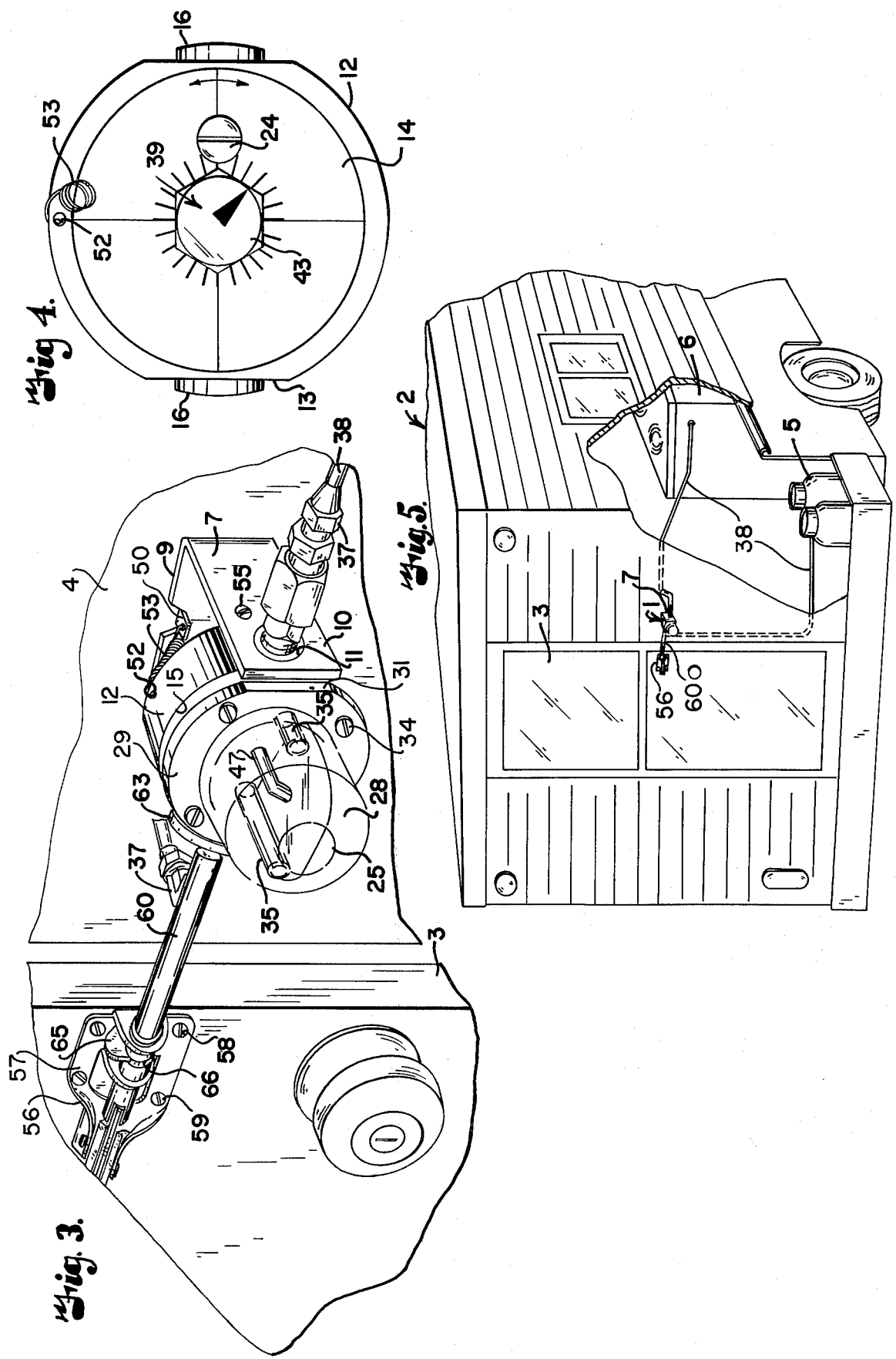

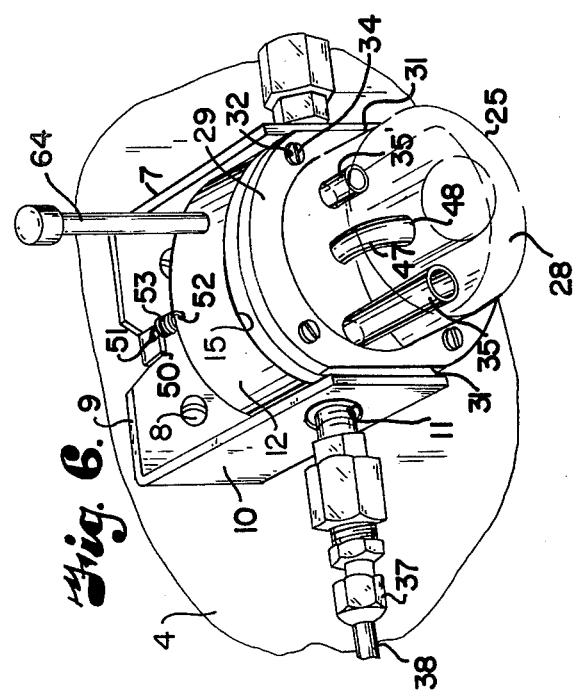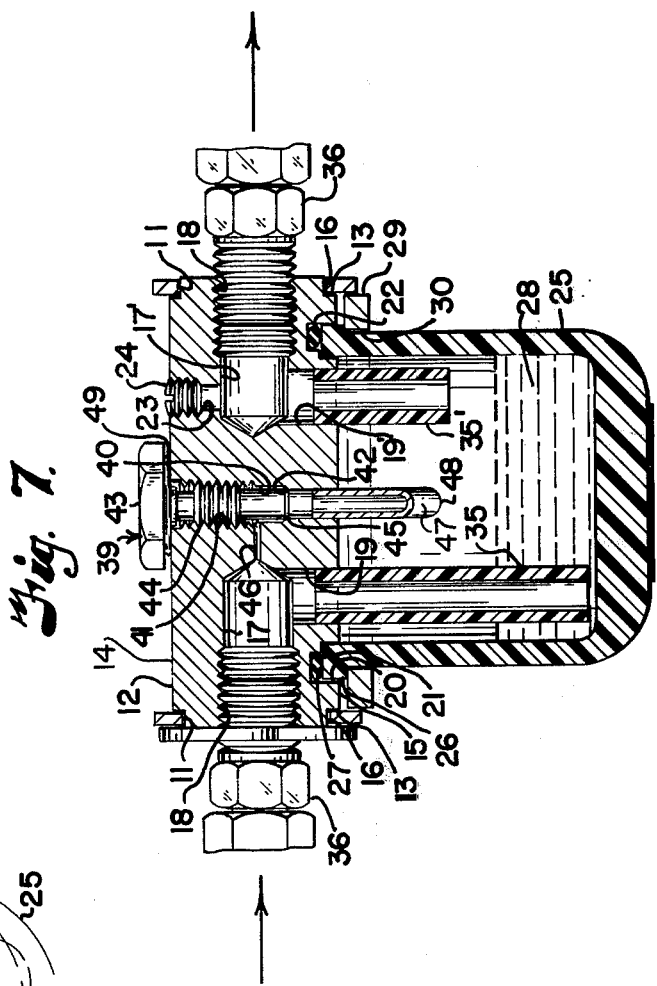

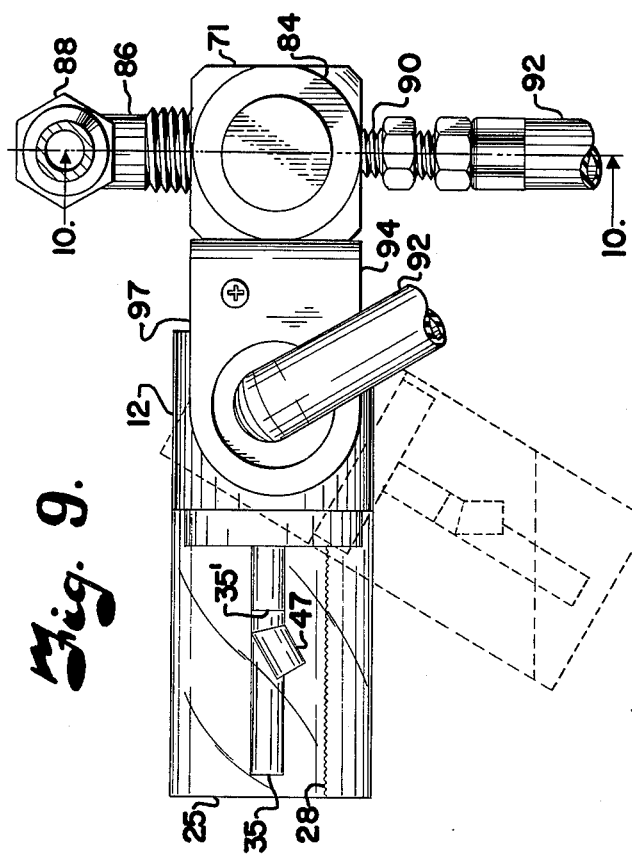
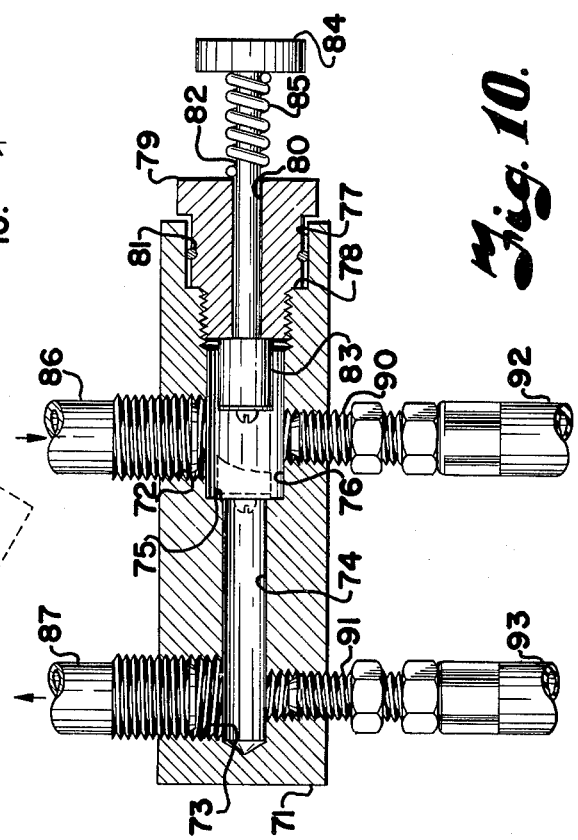
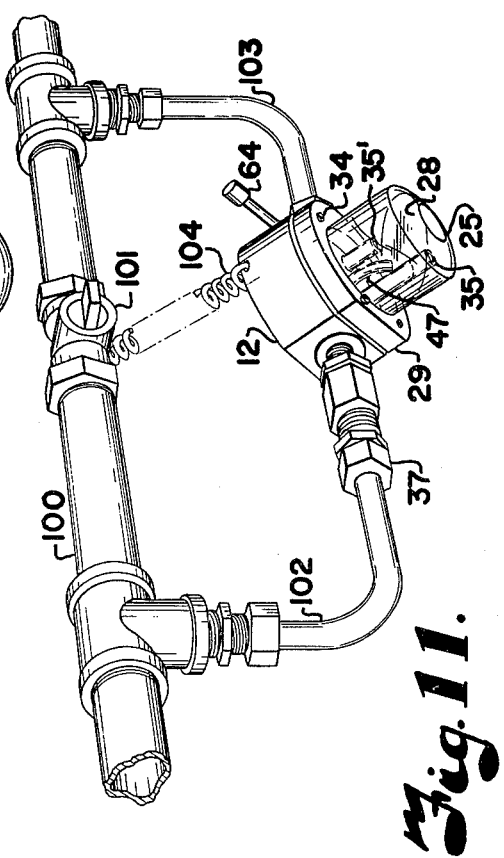

LEAK DETECTING APPARATUS

This is a continuation-in-part of application Ser. No. 264,041 filed June 19, 1972 now abandoned.

The present invention relates to a gas leak detecting apparatus and more particularly, to such devices that are adapted to be mounted on gas lines for trailers, campers, homes, and the like and connected in series to the gas line to enable a person to check for leakage of gas thereinto before entering.

The principle objects of the present invention are: to provide a visual leak detecting apparatus particularly suited for gas systems of house trailers, campers, and the like; to provide such apparatus which is actuated by tilting on rotary unions so that the apparatus may be installed with conventional rigid pipes or tubes; to provide such an apparatus having an adjustable valve to compensate for flow of gas to pilot lights; to provide such an apparatus having a latch arrangement associated with a door so that the apparatus is automatically activated upon partially opening the door; to provide such an apparatus that has no internal moving parts for normal operation; to provide such a leak detecting apparatus having a valve member selectively movable to interrupt gas flow in the gas pipe system and bores and passages for directing any gas flow to and through a flow tube having one end submersible in liquid to create visable bubbles; and to provide such a leak detecting apparatus which is compact and easy to use, inexpensive to manufacture, easy to install and maintain, durable in operation, and particularly well adapted for the proposed use.

Other objects and advantages of this invention will become apparent from the following description taken in connection with the accompanying drawings wherein are set forth, by way of illustration and example, certain embodiments of the present invention.

FIG. 1 is a fragmentary perspective view of a leak detecting apparatus embodying features of the present invention and shown in a non-test position.

FIG. 2 is a fragmentary perspective view of the leak detecting apparatus tilted to a test position in response to partial opening of a door.

FIG. 3 is a fragmentary perspective view of the leak detecting apparatus in a non-test position with a safety latch disengaged to allow full opening of the door.

FIG. 4 is a rear elevational view of the leak detecting apparatus disengaged from its mounting and particularly showing a pilot compensating adjustor.

FIG. 5 is a fragmentary perspective view of a typical camper provided with the leak detecting apparatus and having a portion of the camper broken away to show the gas system.

FIG. 6 is a perspective view of a modified form of the leak detecting apparatus adapted for independent actuation.

FIG. 7 is a cross sectional view through the apparatus showing interior construction.

FIG. 8 is a perspective view of a second modified form of the leak detecting apparatus adapted to interrupt gas flow during testing for leaks.

FIG. 9 is a side elevational view of the second modified form of the apparatus and showing a test position in broken lines.

FIG. 10 is a longitudinal sectional view of the second modified form showing interior construction thereof.

FIG. 11 is a perspective view of the form shown in FIG. 6 mounted for home use.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates a leak detecting apparatus intended for mounting on a mobile shelter or home 2, such as camping trailers, house trailers, truck-mounted campers, or the like. The leak detecting apparatus 1 is adapted to be mounted adjacent a door 3 on a wall 4 and piped or plumbed in series between fuel gas containing bottles 5 and gas appliances 6 whereby any flow of gas to the appliances 6 must pass through the apparatus 1.

In the example illustrated, a U-shaped bracket 7 is secured to the wall 4 by suitable securing devices 8 that extend through apertures (not shown) in a bracket web portion 9. The U-shaped bracket 7 has spaced arms 10 extending outwardly from the web portion 9 and aligned transverse apertures 11 are disposed adjacent outermost free ends of the spaced arms 10.

A body 12 preferably has opposed generally flat sides 13 and opposed generally flat end surfaces 14 and 15. Projections 16 extend from each of the flat sides 13 and are received into the aligned apertures 11 with sufficient clearance to allow the body 12 to tilt or swivel therein. Bores 17 and 17' extend inwardly respectively through the projections 16, in this example, for approximately one-third of the total distance between the flat sides 13. Threads 18 are formed along a portion of the length of each of the bores 17 and 17' adjacent a respective one of the projections 16.

Passageways or bores 19 and 19' extend through the flat surface 15 and generally perpendicularly thereto and into the body 12 in a manner intersecting respective bores 17 and 17'. Also formed in the surface 15 is an annular groove 20 surrounding the passageways 19 and 19'. The groove 20 has a spacing step 21 therein and contains a suitable sealing member 22, such as an O-ring or gasket. A threaded bore 23 extends into the body 12 from the surface 14 and communicates with the passageway 19' through the bores 17'. A filling plug 24 is removably received in the bore 23.

A transparent bowl 25 has an annular flange 26 on an open end 27 of a cylindrical side wall. The flange 26 is received into the annular groove 20 and through securing structure described below engages the O-ring 22 thereby forming a seal therebetween. The open end 27 of the bowl 25 also engages the step 21 thereby limiting the amount of compression on the sealing member 22. Preferably, the bowl 25 is made of clear or transparent material, such as plastic, or glass, and is partially filled through the bore 23 with a suitable liquid 28 that has a low freezing point and does not evaporate easily in a fuel gas environment.

A ring 29 has an inside surface 30 slightly larger than the side wall of the bowl 25 and is slidably received thereover. The ring 29 engages the flange 26 and has flat side portions 31 that correspond to the flat sides 13 of the body 12. A plurality of holes 32 extend through the ring 29 and parallel to the plane of the flat side portions 31 to receive screws 34 which engage in threaded holes (not shown) in the body 12 thereby securing the flange 26 within the groove 20.

Tubular members 35 and 35' are mounted in the respective passageways 19 and 19' and each extend therefrom into the compartment formed by the union of the body 12 with the bowl 25. The tubular member 35 is substantially longer than the tubular member 35' and as noted below, is at times submerged within the liquid 28. The tubular member 35' is of a length in relation to the level of the liquid 28 that it will never be submerged. As described further below, the bore 17 constitutes the inlet and the bore 17' constitutes the outlet for the leak detecting apparatus 1.

A rotary union 36 is threadedly received in each of the bores 17 and 17' and each includes flare fittings 37. Tubing 38 is connected to each of the fittings 37 and extends to the bottles 5 and to the appliances 6 respectively thereby completing the piping system between same; thus, all gas that exists from the bottles 5 must first pass through the body 12 and the bowl 25 before flowing to the appliances 6.

The body 12 is provided with a pilot compensator or flow metering valve designated generally by the numeral 39. The compensator comprises a bore 40 extending through the body 12 and is threaded at 41. The bore 40 is provided with a tapered valve seat 42 which in the illustrated example is located approximately two-thirds of the distance through the body from the surface 14. A needle valve core 43 has a threaded portion 44 threadedly received within the bore 40 and a tapered valve surface 45 that corresponds to the seat 42. The exposed end of the needle valve core 43 has a hex head or other suitable grasping structure so that the core 43 can be easily adjusted.

An elongated passageway 46 extends between and communicates with the inlet bore 17 and the bore 40. The passageway 46 intersects the bore 40 at a position above the seat 42 whereby any gas flowing through the passageway 46 must pass between the seat 42 and the valve surface 45. As described below, by adjusting the core 43, compensation can be made for a continuing flow of gas to the pilots.

A tubular member 47 is installed in the lower portion of the bore 40 and extends into the bowl 25. The tubular member 47 has a curved free end 48 bent from the axis of the tubular member 47 and is in spaced relation to the liquid 28 at all times to prevent the liquid from splashing on the valve structure described below.

The body surface 14 and the head of the needle valve core 43 preferably have suitable markings thereon for resetting a predetermined flow rate when desired. To prevent any leakage past the threads at 44, an O-ring seal 49 is provided between the valve core 43 and the body 12.

The U-shaped bracket 7 has an ear 50 formed in the web portion 9 with an aperture 51 therethrough. The body 12 has a bore 52 preferably extending through and between the side and the surface 14 and an elongated spring 53 has opposite free ends with hooks thereon that extend respectively through the aperture 51 and the bore 52. The spring 53 is operable to return the body 12 to the horizontal or non-test position, as viewed in FIG. 1, after being tilted to a test position, as shown in FIG. 2. An aperture 54 extends through one of the arms in the bracket 7 and an inwardly projecting pin 55 is secured in the aperture 54 and forms a stop for limiting the amount of tilting of the body 12.

A latch 56 is mounted on the door 3 adjacent the wall mounted apparatus 1. The latch 56 includes a base portion 57 having a plurality of apertures 58 therethrough each receiving suitable fastening or securing devices 59. An elongated member or bolt 60 forms part of the latch 56 and may be selectively extended or retracted by a suitable lever 61.

The projection 16 adjacent the door 3 has a member 62 suitably secured thereto and disposed outwardly of the arm 10. The member 62 has an extending portion or lug 63 that is positioned to engage the elongated member or bolt 60 in its extended position, as best seen in FIG. 2. Upon partially opening the door 3 the elongated member or bolt 60 engages the lug 63 causing a tilting of the body 12 and the bowl 25 to the extent permitted by the pin 55. This also results in preventing the door 3 from being opened further until the bolt 60 is withdrawn.

On tilting of the body 12, the tubular member 35 has the free end thereof submerged in the liquid 28 and any gas flowing therethrough causes easily viewed bubbles thereby giving warning of leakage into the enclosure.

The latch 56 is provided with suitable locking means to help prevent the accidental locking of a person in the structure. The locking means consists of a lock plate 65 which is pivotally mounted on the base 57 of the latch 56. A spring (not shown) resiliently retains the lock plate 65 within a groove or slot 66, so that when the bolt 60 is in the retracted position, it may not be extended without first lifting the lock plate 65.

A modified form of the leak detecting apparatus is illustrated in FIG. 6. In this form, a handle 64 is secured to the body 12 thereby providing grasping means for an operator to manually tilt the body 12 for submerging the free end of the tubular member 35 in the liquid 28. As previously described, the body 12 is tilted downwardly either manually or by door operation until the free end of the tubular member 35 is submerged within the liquid 28 thereby providing a testing position.

The pilot light of the appliances, if any, may be "dialed out" by adjusting the pilot compensator 39 when the body 12 is in the tilted position until gas bubbles cease to flow through the liquid 28. Following such an adjustment additional gas flow through the leak detecting apparatus may be interpreted as unwanted gas leakage. Even though the leak detecting apparatus, as discussed above, is used in a bottle gas system on campers, trailers, and the like, it is equally applicable to other gas flow systems to check for gas leakage.

In the forms of the leak detecting apparatus shown in FIGS. 1 to 7 inclusive, all gas flow is through the leak detecting apparatus. As the number and/or size of appliances increases, it has been found that the leak detecting apparatus unduly restricts flow and a by pass must be provided for non-test flow. Then gas flow, if any, through the by pass is interrupted and directed through the leak detecting apparatus for testing for leaks in the system.

FIGS. 8 to 10 inclusive illustrate the latter form of the leak detecting apparatus. In a preferred embodiment of this form the body 12 is mounted on a second body 71 having an inlet bore 72 and an outlet bore 73 extending through the second body 71. The inlet bore 72 and the outlet bore 73 are illustrated as being substantially parallel and each having threaded opposite ends, for a purpose later described.

A passage 74 extends between the inlet bore 72 and the outlet bore 73 to permit gas flow between the bores 72 and 73. The passage 74 has a valve seat 75 located between the bores 72 and 73.

The second body 71 has an enlarged portion forming a chamber 76 extending inwardly from an exterior surface thereof and forming the valve seat 75. In the illustrated embodiment, the chamber 76 is co-axial with the passage 74 and has a further enlarged portion 77 adjacent an exterior surface of the second body 71 thereby defining a seat or shoulder 78, for a purpose later described. The chamber 76 is generally cylindrical in shape and has threads extending inwardly from the seat or shoulder 78 for mounting a valve guide 79.

The valve guide 79 has a bore 80 aligned with an preferably co-axial with the passage 74 extending between the inlet bore 72 and the outlet bore 73. One end portion of the valve guide 79 is threaded to be received within the threads in the chamber 76. The other end portion of the valve guide 79 is enlarged and has a surface engageable with the shoulder or seat 78 in the chamber 76. The valve guide 79 is preferably mounted in a gas tight relation within the chamber 76 to prevent escape of gas from the inlet bore 72. Therefore, the surface of the enlarged end portion of the valve guide 79 has a suitable recess therein adapted to receive a sealing member, such as an O-ring 81, which is sealingly engageable with the enlarged portion 77 of the chamber 76.

A valve shaft 82 is positioned in the bore 80 of the valve guide 79 and movable longitudinally of the bore 80. An interior end 83 of the valve shaft 82 is enlarged and shaped to engage the one or interior end of the valve guide 79 and the interior end 83 is also shaped to seat on or engage the valve seat 75 at the entrance to passage 74 to thereby close same and direct any gas flow through the inlet bore 72 into the body 12. The chamber 76 and the interior end 83 of the valve shaft 82 are sized to permit gas to flow around the valve shaft 82 when closing the entrance to the passage 74.

The other or exterior end 84 of the valve shaft 82 is enlarged to provide an abutment for a suitable resilient member, such as a compression spring 85, extending between and engaging the exterior surface of the valve guide 79 and the enlarged exterior end 84 of the valve shaft 82. The spring 85 thereby moves the interior end 83 of the valve shaft 82 into engagement with the interior end of the valve guide 79 and thereby maintains the interior end 83 of the valve shaft 82 in an open position until it is desired to manually move same to a position closing the passage 74.

The inlet bore 72 and the outlet bore 73 of the second body 71 are operatively connected to the gas pipe system for flow through the second body 71 and the body 12 to the appliances 6. In the illustrated structure, an inlet elbow 86 is mounted in one end of the inlet bore 72 and an outlet elbow 87 is mounted in one end of the outlet bore 73. The inlet elbow 86 and the outlet elbow 87 each have an end of one leg thereof threaded to be received within the respective bores in the second body 71. The other legs of the elbows 86 and 87 are connected to suitable fittings 88 and 89 respectively which are mounted on suitable tubing of the gas pipe system.

Suitable nipples 90 and 91 are mounted in the other ends of the inlet bore 72 and the outlet bore 73 respectively and are connected to the body 12 by flexible flow members 92 and 93. The flexible flow members 92 and 93 each have one end mounted on a respective nipple and the other end mounted on a respective rotary union (not shown) in the body 12. The flexible flow members 92 and 93 are torsion loaded to urge the body 12 toward and maintain same in the non-test position.

The body 12 of this embodiment is mounted on the second body 71 in a manner similar to the previously described mounting of the body 12 on the mobile shelter 2 and the illustrated mounting includes a bracket 94 having a web portion 95 suitably secured to the second body 71, as by screws 96. The bracket 94 has outwardly extending arms 97 and 98 each having suitable apertures (not shown) to receive and rotatably support the respective rotary unions as previously described.

In using the leak detecting apparatus illustrated in FIGS. 8 to 10 inclusive, the valve shaft 82 is manually moved to the closed position thereby compressing the spring 85 and seating the interior end 83 on the valve seat 75 thereby closing the passage 74 between the inlet bore 72 and the outlet bore 73. Any gas must then flow around the interior end 83 of the valve shaft 82 and through the nipple 90 and flexible flow member 92 into the body 12. The body 12 is tilted downwardly to submerge the free end of the tubular member 35 in the liquid 28 whereby any gas flow through the tubular member 35 will appear as visible gas bubbles in the liquid 28. After the test for gas leakage through the chamber defined by the transparent bowl 25 and the body 12, the valve shaft 82 and the body 12 are released whereby the spring 85 moves the valve shaft 82 to the closed position and the flexible flow members 92 and 93 return the body 12 to the non-test position.

FIG. 11 illustrates a further modified form of this invention wherein the leak detector is mounted in a rigid piping system, such as that used in conventional homes. In this example a gas line 100 has a gas valve 101 mounted therein and selectively movable to interrupt gas flow therethrough and thereby direct gas flow, if any, through the submersible tubular member 35.

When the valve 101 is positioned in the flow interrupting position, any gas flow is directed through an inlet tubing 102 which is positioned upstream of the gas valve 101 for flow into the body 12. Tilting the body 12 by the handle 64 until the free end of the tubular member 35 is submerged within the liquid 28 provides a test position. Gas flow, if any, returns to the gas line 100 through an outlet tubing 103 which is positioned downstream of the gas valve 101.

A resilient member 104 extends between the body 12 and a suitable anchoring point and has respective opposite ends connected thereto for returning the body 12 to a non-test position.

It is to be understood that while I have illustrated and described certain forms of my invention, it is not to be limited to these specific forms or arrangement of parts herein described and shown.

What I claim and desire to secure by Letters Patent is:

1. Apparatus for detecting leaks into a mobile shelter and the like from a bottled gas pipe system associated therewith comprising:

a. a body having first and second bores extending inwardly from the exterior thereof, a transparent bowl mounted on said body and forming a closed compartment therewith, said first and second bores opening into said compartment;

b. a first tubular member engaged in said first bore and having one end projecting into said compartment, liquid partially filling said compartment to the extent that said one end is selectively free of and submerged in said liquid upon tilting said body from a first position to a second position on an axis transverse to said tubular member;

c. means for mounting said body on said mobile shelter for tilting between said first and second positions;

d. means connecting said pipe system to said bores for flow through said bores and out said one end;

e. means engaging said body for selectively urging said body to remain in said first position;

f. means for selectively tilting said body to said second position;

g. a third bore through said body and opening into said compartment;

h. an elongated passageway communicating with and extending between said first bore and said third bore; and i. adjustable valve means operably engaged along said third bore and said elongated passageway to control flow from said first bore through said elongated passageway and third bore into said compartment.

2. The apparatus as set forth in claim 1 including:
a. a tubular member engaged in said third bore and extending into said compartment, and
b. said last named tubular member having a curved free end spaced above the level of said liquid when said body is in said first and second positions.

3. Apparatus for detecting leaks into a mobile shelter and the like from a bottled gas pipe system associated therewith comprising:
a. a body having first and second bores extending inwardly from the exterior thereof, a transparent bowl mounted on said body and forming a closed compartment therewith, and first and second bores opening into said compartment;
b. a first tubular member engaged in said first bore and having one end projecting into said compartment, liquid partially filling said compartment to the extent that said one end is selectively free of and submerged in said liquid upon tilting said body from a first position to a second position on an axis transverse to said tubular member;
c. means for mounting said body on said mobile shelter for tilting between said first and second positions;
d. means connecting said pipe system to said bores for flow through said bores and out said one end;
e. means engaging said body for selectively urging said body to remain in said first position; and
f. means for selectively tilting said body to said second position;
g. said mobile shelter including a wall and a door mounted in said wall, said door having opposite edges, one of said door edges being hingedly associated with said wall; and
h. said tilting means including a member engaging said door and operably associated with said body for producing said tilting to said second position upon at least partially opening said door.

4. The apparatus as set forth in claim 3 wherein:
a. said door engaging member comprises a latch assembly secured to said door adjacent the other of said door edges and including a bolt movable into and out of operable engagement with said body.

5. The apparatus as set forth in claim 4 including:
a. means associated with said body for trapping said bolt when the latter is in said operable engagement with said body, whereby said bolt restricts the full opening of said door.

6. Apparatus for detecting leaks into a mobile shelter and the like from a bottled gas pipe system associated therewith comprising:
a. a body having first and second bores extending inwardly from opposite sides thereof, first and second passageways in said body and respectively communicating with said first and second bores, a transparent bowl secured to said body and forming a closed compartment therewith, said first and second passageways opening into said compartment;
b. a tubular member engaged in said first passageway and having a free end projecting into said compartment, liquid partially filling said compartment to the extent that said free end is selectively in spaced relation to and submerged in said liquid upon tilting said body from a first position to a second position on an axis transverse to said tubular member;
c. a mounting member secured to said mobile shelter;
d. means for tiltably mounting said body to said member;
e. means connecting said pipe system to said bores for flow through said bores and passageways and out said free end;
f. a resilient member engaging and extending between said mounting member and said body for selectively urging said body to remain in said first position; and
g. means for selectively tilting said body to said second position;
h. said mounting member including a U-shaped bracket having spaced apart arms; and
i. said tiltable mounting means including an aperture through each of said arms in substantially aligned relation and projections integral with said body, each of said projections extending from a respective opposite side of said body and being received in one of said apertures, said bores extending into said projections.

7. Apparatus for detecting leaks into a mobile shelter and the like from a bottled gas pipe system associated therewith comprising:
a. a body having first and second bores extending inwardly from opposite sides thereof, first and second passageways in said body and respectively communicating with said first and second bores, a transparent bowl secured to said body and forming a closed compartment therewith, said first and second passageways opening into said compartment;
b. a tubular member engaged in said first passageway and having a free end projecting into said compartment, liquid partially filling said compartment to the extent that said free end is selectively in spaced relation to and submerged in said liquid upon tilting said body from a first position to a second position on an axis transverse to said tubular member;
c. a mounting member secured to said mobile shelter;

d. means for tiltably mounting said body to said member;
e. means connecting said pipe system to said bores for flow through said bores and passageways and out said free end;
f. a resilient member engaging and extending between said mounting member and said body for selectively urging said body to remain in said first position;
g. means for selectively tilting said body to said second position;
h. a third bore through said body and opening into said compartment, said third bore having a threaded portion and a valve seat therein;
i. a third passageway communicating with and extending between said first passageway and said third bore, said valve seat being located between said first passageway and said compartment; and
j. an adjustable needle valve having a threaded portion engaging said third bore threaded portion and a seat portion in operable relation to said valve seat.

8. Apparatus for detecting leaks into a mobile shelter and the like from a bottled gas pipe system associated therewith comprising:
  a. a body having first and second bores extending inwardly from opposite sides thereof, first and second passageways in said body and respectively communicating with said first and second bores, a transparent bowl secured to said body and forming a closed compartment therewith, said first and second passageways opening into said compartment;
  b. a tubular member engaged in said first passageway and having a free end projecting into said compartment, liquid partially filling said compartment to the extent that said free end is selectively in spaced relation to and submerged in said liquid upon tilting said body from a first position to a second position on an axis transverse to said tubular member;
  c. a mounting member secured to said mobile shelter;
  d. means for tiltably mounting said body to said member;
  e. means connecting said pipe system to said bores for flow through said bores and passageways and out said free end;
  f. a resilient member engaging and extending between said mounting member and said body for selectively urging said body to remain in said first position; and
  g. means for selectively tilting said body to said second position;
  h. said mobile shelter including a wall and a door mounted in said wall, said door having opposite edges one of said door edges being hingedly associated with said wall; and
  i. a latch assembly secured to said door adjacent the other of said door edges and including a bolt movable into and out of operable engagement with said body for tilting said body from said first position to said second position upon partially opening of said door.

9. Apparatus for detecting leaks into a mobile shelter and the like from a bottled gas pipe system associated therewith comprising:
  a. a body having first and second bores extending inwardly from the exterior thereof, a transparent bowl mounted on said body and forming a closed compartment therewith, said first and second bores opening into said compartment;
  b. a first tubular member engaged in said first bore and having one end projecting into said compartment, liquid partially filling said compartment to the extent that said one end is selectively free of and submerged in said liquid upon tilting said body from a first position to a second position on an axis transverse to said tubular member;
  c. means for mounting said body on said mobile shelter for tilting between said first and second positions;
  d. means connecting said pipe system to said bores for flow through said bores and out said one end;
  e. means engaging said body for selectively urging said body to remain in said first position;
  f. means for selectively tilting said body to said second position;
  g. means connected to the gas pipe system for selectively interrupting gas flow in the gas pipe system and for directing gas flow through said first and second bores in said body including flow out the one end of said tubular member;
  h. said gas flow interrupting and directing means including a second body having spaced first and second bores extending therethrough;
  i. first flow means communicating said first bore in said second body with said first bore in said first named body and second flow means communicating said second bore in said second body with said second bore in said first named body;
  j. means for connecting the gas pipe system to said first and second bores in said second body for flow through said first and second bores in said second body including flow through said first named body;
  k. a passage in said second body communicating with and extending between said first and second bores therein and having a valve seat positioned between said first and second bores;
  l. a chamber extending inwardly from an exterior surface of said second body and communicating with the valve seat in said passage; and
  m. adjustable valve means mounted in said chamber and operative to close said passage in said second body while permitting gas flow through said first bore in said second body.

10. A leak detecting apparatus as set forth in claim 9 wherein said valve means includes:
  a. an elongated valve shaft having one end thereof enlarged and movable to close said passage and an enlarged portion on the other end thereof;
  b. means in said second body for defining a chamber extending inwardly from an exterior surface of said second body and communicating with said passage;
  c. a shaft guide mounted on said second body and having opposite ends and having a bore therethrough communicating with said chamber in said second body, said valve shaft being movable longitudinally in the bore in said shaft guide; and
  d. means extending between and engaging one end of said shaft guide and said enlarged portion on the other end of said valve shaft for urging the enlarged one end of said valve shaft away from said passage and into engagement with the other end of said shaft guide.

11. An apparatus for detecting leaks into an enclosure from a gas pipe system and comprising:

a. a body having a first bore and a second bore each extending inwardly from the exterior thereof;

b. a transparent bowl mounted on said body and forming a closed compartment therewith, said first and second bores each opening into said compartment;

c. a tubular member communicating with said first bore and having one end thereof projecting into said compartment;

d. liquid partially filling said compartment to the extent that the one end of said tubular member is free of said liquid when said body is in a first position and is submerged in said liquid upon moving said body from the first position to a second position;

e. means connected to the gas pipe system and to said body for selectively interrupting gas flow in the gas pipe system and for directing gas flow through said first and second bores in said body including flow out of the one end of said tubular members;

f. means for mounting said body to permit selectively moving said body between the first and second positions;

g. said gas flow interrupting and directing means including a second body having spaced first and second bores extending therethrough and a passage communicating with and extending between said first and second bores therein;

h. adjustable valve means extending into said second body for selectively closing said passage while permitting gas flow through said first bore in said second body; and i. a first flexible flow member connected to and extending between the first bores of said first named body and said second body and a second flexible flow member connected to and extending between the second bores of said first named body and said second body whereby said flexible flow members urge said first named body to remain in the first position.

12. A leak detecting apparatus as set forth in claim 11 wherein:

a. said passage in said second body has a valve seat positioned between said first and second bores;

b. said second body has a chamber extending inwardly from an exterior surface of said second body and communicates with the valve seat in said passage; and c. the chamber and said valve means are sized to permit gas flow around said valve means when said valve means is in engagement with the valve seat in said passage.

13. A leak detecting apparatus as set forth in claim 11 wherein said valve means includes:

a. an elongated valve shaft having one end thereof enlarged and movable to close said passage, said valve shaft having an enlarged portion on the other end thereof;

b. means in said second body for defining a chamber extending inwardly from an exterior surface of said second body and communicates with said passage;

c. a shaft guide mounted on said second body and having opposite ends and having a bore therethrough communicating with said chamber in said second body, said valve shaft being movable longitudinally in the bore in said shaft guide; and d. resilient means extending between and engaging one end of said shaft guide and said enlarged portion on the other end of said valve shaft for urging the enlarged one end of said valve shaft away from said passage.

14. An apparatus for detecting leaks into an enclosure from a gas pipe system and comprising:

a. a body having a first bore and a second bore each extending inwardly from the exterior thereof;

b. a transparent bowl mounted on said body and forming a closed compartment therewith, said first and second bores each opening into said compartment;

c. a tubular member communicating with said first bore and having one end thereof projecting into said compartment;

d. liquid partially filling said compartment to the extent that the one end of said tubular member is free of said liquid when said body is in a first position and is submerged in said liquid upon moving said body from the first position to a second position;

e. means connected to the gas pipe system and to said body for selectively interrupting gas flow in the gas pipe system and for directing gas flow through said first and second bores in said body including flow out the one end of said tubular members;

f. means for mounting said body to permit selectively moving said body between the first and second positions;

g. a third bore through said first named body and opening into said compartment;

h. an elongated passageway communicating with and extending between said first bore and said third bore in said first named body; and i. adjustable valve means operably engaged along said third bore and said elongated passageway to control gas flow from said first bore through said elongated passageway and said third bore into said compartment.

15. A leak detecting apparatus as set forth in claim 14 including:

a. a tubular member communicating with said third bore and extending into said compartment; and b. a curved free end on said last named tubular member, said curved free end being spaced above the level of said liquid when said body is in the first and second positions.

* * * * *